United States Patent
Crilly, Jr.

(10) Patent No.: US 8,731,461 B2
(45) Date of Patent: May 20, 2014

(54) REPEATER FOR MIMO SIGNALS IN A NETWORK

(75) Inventor: William J. Crilly, Jr., Dunbarton, NH (US)

(73) Assignee: Cellular Specialties, Inc., Manchester, NH (US)

( * ) Notice: Subject to any disclaimer, the term of this patent is extended or adjusted under 35 U.S.C. 154(b) by 233 days.

(21) Appl. No.: 13/373,637

(22) Filed: Nov. 22, 2011

(65) Prior Publication Data

US 2012/0128038 A1     May 24, 2012

Related U.S. Application Data

(60) Provisional application No. 61/458,344, filed on Nov. 22, 2010.

(51) Int. Cl.
*H04B 7/14* (2006.01)
*H04B 15/00* (2006.01)

(52) U.S. Cl.
USPC ......... 455/7; 455/562.1; 455/13.3; 455/67.11

(58) Field of Classification Search
USPC ............ 455/7, 8, 11.1, 13.1, 23, 24, 16, 66.1, 455/453.5, 67.11, 13.3, 561, 562.1
See application file for complete search history.

(56) References Cited

U.S. PATENT DOCUMENTS

| | | | |
|---|---|---|---|
| 3,144,647 A * | 8/1964 | Sichak | 342/361 |
| 5,917,811 A | 6/1999 | Weaver, Jr. et al. | |
| 6,556,551 B1 | 4/2003 | Schwartz | |
| 6,687,501 B2 | 2/2004 | Soliman | |
| 7,123,928 B2 | 10/2006 | Moeglein et al. | |
| 2002/0048071 A1 | 4/2002 | Suzuki et al. | |
| 2003/0008663 A1 | 1/2003 | Stein et al. | |
| 2003/0050041 A1 | 3/2003 | Wu | |
| 2003/0157943 A1 | 8/2003 | Sabat, Jr. | |
| 2005/0075139 A1 | 4/2005 | Shapira | |
| 2007/0291867 A1 | 12/2007 | Khan et al. | |
| 2008/0299896 A1 * | 12/2008 | Mohebbi | 455/8 |
| 2009/0233605 A1 | 9/2009 | Kim | |
| 2009/0323582 A1 | 12/2009 | Proctor, Jr. et al. | |
| 2010/0091678 A1 | 4/2010 | Chen et al. | |
| 2010/0309884 A1 | 12/2010 | Haverty | |
| 2012/0027054 A1 * | 2/2012 | Palanki et al. | 375/211 |

OTHER PUBLICATIONS

Sam Knight, gpsOne Enabled LBS, A North American Case Study, TechnoCom Wireless Location Leaders, 2002 CDMA Americas Congress, Dec. 2002.

Qualcomm Incorporated, Qualcomm Repeater Technologies to Improve Network Performance, 80-W0013-1 Rev A. 2003, Qualcomm Incorporated, San Diego, CA 92121 USA.

Federal Communications Commission, OET Bulletin No. 71, Guidelines for Testing and Verifying the Accuracy of Wireless E911 Location Systems, Apr. 12, 2000.

(Continued)

*Primary Examiner* — John J Lee

(74) *Attorney, Agent, or Firm* — Devine, Millimet & Branch, P.A.; Paul C. Remus; Kimberly A. Peaslee

(57) ABSTRACT

A system to repeat MIMO signals in a network by orthogonally polarizing the signals and maintaining the orthogonal polarization.

7 Claims, 3 Drawing Sheets

(56) References Cited

OTHER PUBLICATIONS

Jeffrey H. Reed, Kevin J. Krizman, Brian D. Woerner, Theodore S. Rappaport, An Overview of the Challenges and Progress in Meeting the E-911 Requirement for Location Service, IEEE Communications Magazine, Apr. 1998, pp. 30-37.

Andy D. Kucar, Mobile Radio: An Overview, IEEE Communications Magazine, Nov. 1991, pp. 72-85.

GPS-Practice-and-Fun.com, Find it with GPS, A-GPS explained in historical context, Introduction to Assisted-GPS (A-GPS), Apr. 4, 2011.

Waqas ur Rehman, Eyal de Lara, Stefan Saroiu, ClLoS Indoor Localization System, UBIComp '08, Sep. 21-24, 2008, Seoul, Korea. Copyright 2008 ACM 978-1-60558-136-01/08/09.

Federal Communications Commission, Comment Sought on Proposals Regarding Service Rules for Wireless Enhanced 911 Phase II Location Accuracy and Reliability, PS Docket No. 07-114, DA 08-2129, Released Sep. 22, 2008.

Nadezda Sokolova, Borje Forssell, Modern Pedestrian Traffic, Indoor HSGPS Receiver Performance, European Journal of Navigation, vol. 5, No. 3, Jul. 2007

Qualcomm Engineering Services Group, Qualcomm White Paper, Repeaters for Indoor Coverage in CDMA Networks, 80-31576-1 Rev B, Qualcom Incorporated, San Diego, CA 92121-1714, USA, 2003.

Qualcomm CDMA Technologies, gpsOne User Plane Handset Specification, Qualcomm Incorporated, San Diego, CA 92121-1714 USA, 80-V6114-1NP Rev. D, Jul. 11, 2003.

Qualcomm, gpsOne User Plane Handset V2 Protocol Specification (Nonproprietary), Qualcomm Incorporated and SnapTrack, Inc., 80-V6114-2NP B, May 26, 2004.

Masudur Rahman, Per Ernstrom, Repeaters for Hotspot Capacity in DS-CDMA Networks, IEEE Transactions on Vehicular Technology, vol. 53, No. 3, May 2004, pp. 626-633.

Wang Kedong, Yan Lei, Wen Hui, He Kai, GpsOne: a New Solution to Vehicle Navigation, 0-7803-8416-4/04, 2004 IEEE, pp. 341-346.

Christian B. Almazan, Moustafa Youssef, Ashok K. Agrawala, Rover: An Integration and Fusion Platform to Enhance Situational Awareness, 1-4244-1338-6/07, 2007 IEEE, pp. 582-587.

TIA/EIA Interim Standard, Position Determination Service Standards for Dual Mode Spread Spectrum Systems, Addendum 1, TIA/EIA/IS-801-1, Mar. 2001, Telecommunications Industry Association 2001, Arlington, VA 22201, USA.

\* cited by examiner

US 8,731,461 B2

REPEATER FOR MIMO SIGNALS IN A NETWORK

CROSS-REFERENCE TO RELATED APPLICATIONS

The present application claims the benefit of Provisional Patent Application Ser. No. 61/458,344 filed Nov. 22, 2010, which is incorporated herein by reference.

FIELD OF THE INVENTION

The present invention relates to repeaters in networks. More particularly, it relates to repeaters in networks for multiple in/multiple out ("MIMO") signals.

BACKGROUND OF THE INVENTION

Traditional 2G and 3G networks consist of one data stream, single input/single output ("SISO") systems. Other networks, including, without limitation, Long Term Evolution ("LTE") networks, utilize a MIMO system. They utilize two streams of data operating on the same channel. They rely on multipath effects to allow the network to disseminate the two streams of data independently to increase download and upload speeds. It is conventional wisdom in the signal processing community that repeaters do not work in these MIMO networks.

As shown in FIG. 1, a repeater 01 with one donor antenna 02 does not work for a base station 04 using antennas 05, 06 to send MIMO signals 07, 08 because of the "keyhole effect." Because both signals 07, 08 must go through a "keyhole," i.e., the one donor antenna 02, all MIMO benefits are lost. The network only operates at SISO speeds.

Alternatively, a MIMO network might use a dual repeater with two donor antennas. However, as shown in FIG. 2, if there is a clear line of sight between the dual repeater 01 with two donor antennas 02, 03, and the base station 04 using antennas 05, 06 to send MIMO signals 07, 08, there is only one effective path, not two. Consequently, all MIMO benefits are lost.

As shown in FIG. 3, if there is scattering of one 07 of the signals 07, 08, two paths are maintained. However, in such a network, if the condition number, the ratio of the strongest signal 08 to the weakest 07 of the two MIMO signals 07, 08 expressed in decibels ("dB") must be low or a high signal to noise ratio ("SNR") is required.

The present invention utilizes two orthogonally polarized antennas on the base station to transmit two orthogonally polarized MIMO signals to two orthogonally polarized donor antennas on two repeaters to maintain two paths. It also utilizes a mechanism to restore high orthogonality in the two orthogonally polarized signals.

SUMMARY OF THE INVENTION

The present invention is a method and apparatus to repeat multiple in/multiple out signals in a network, including an LTE network. It includes a base station with two orthogonally polarized antennas to transmit two orthogonally polarized MIMO signals and a dual repeater with two orthogonally polarized donor antennas to receive the orthogonally polarized systems. It further includes a mechanism to restore the orthogonal polarization of the two signals and a means to lower the condition number of the two signals.

BRIEF DESCRIPTION OF THE DRAWINGS

The foregoing and other objects, features and advantages of the present invention will be apparent from the following detailed description of preferred embodiments thereof, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION AND PREFERRED EMBODIMENTS

Figure 1:
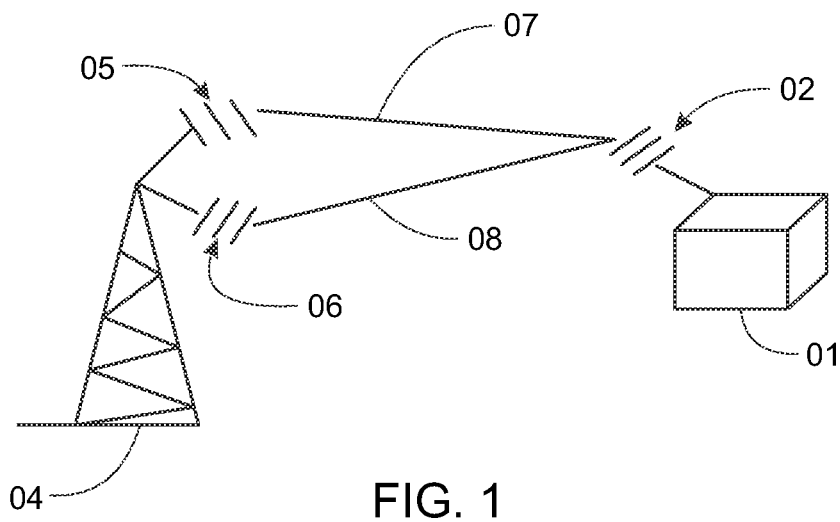
FIG. 1 (prior art) is a schematic of an LTE repeater for MIMO signals with one donor antenna.
Figure 2:
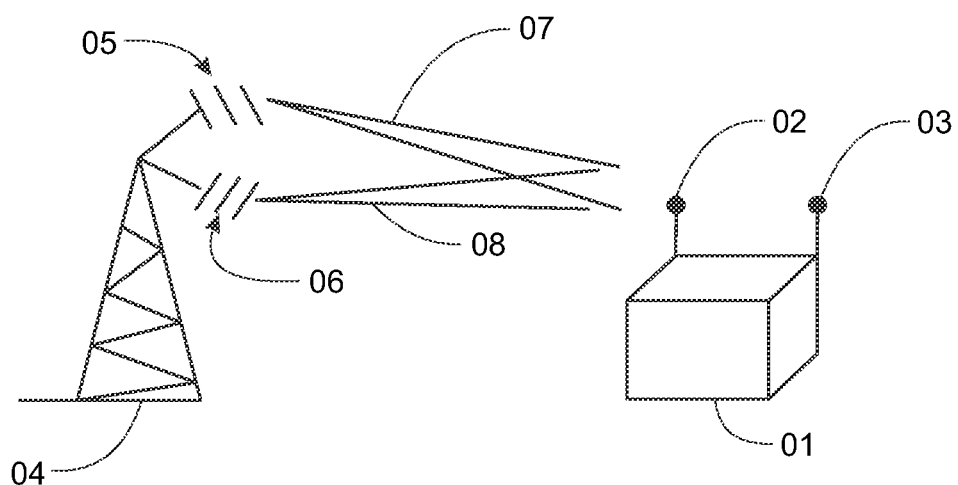
FIG. 2 is a schematic of a dual LTE repeater for MIMO signals with two donor antennas and a clear line of sight to the base station.
Figure 3:
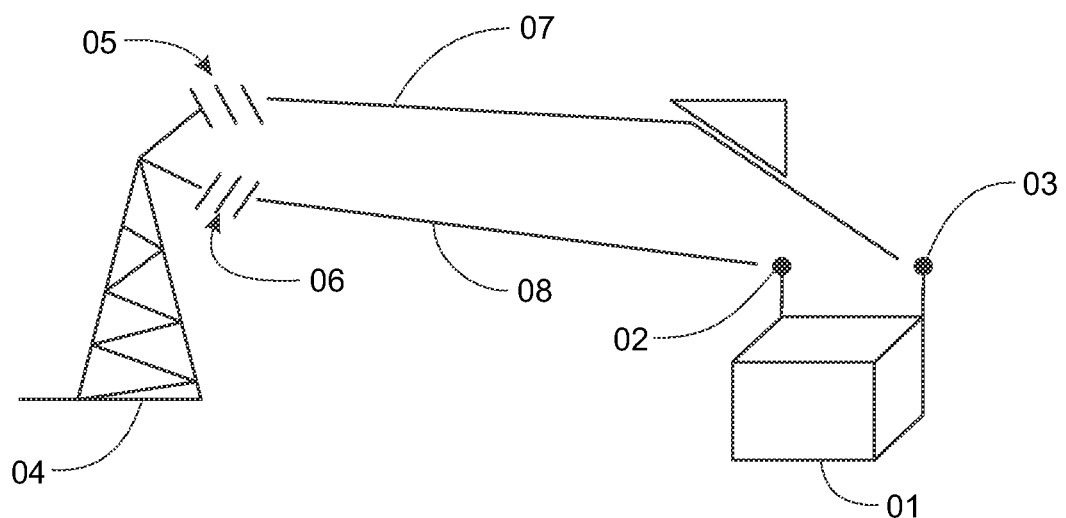
FIG. 3 is a schematic of a dual LTE repeater for MIMO signals with two donor antennas and scattering.
Figure 4:
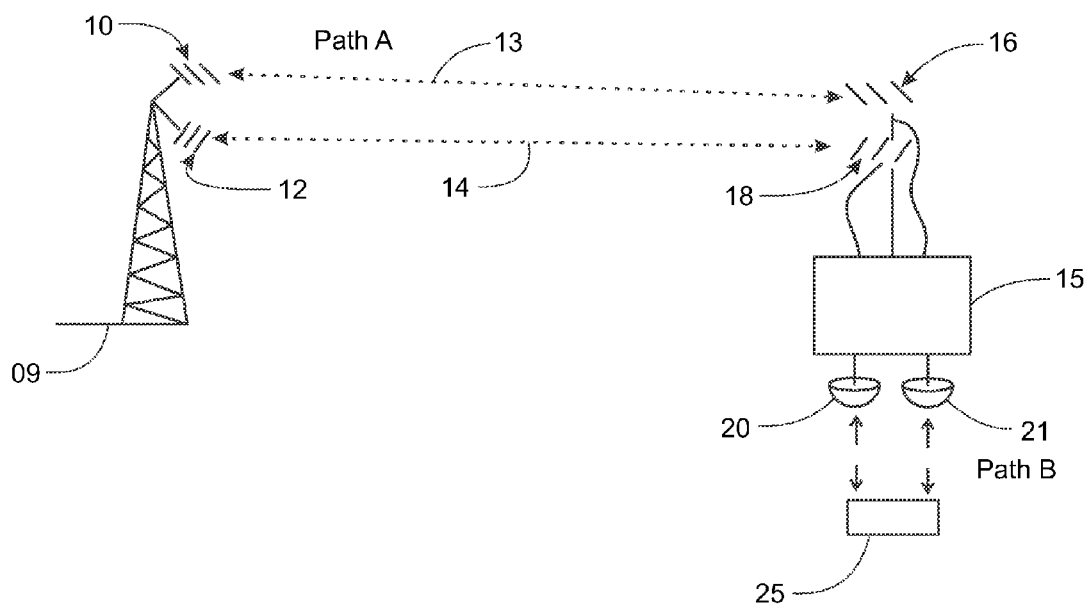
FIG. 4 is a schematic of a preferred embodiment of the present invention.

The present invention is an apparatus and method to repeat MIMO signals in any network. A preferred embodiment comprises a base station 09 in an LTE network for transmitting MIMO signals through orthogonally polarized antennas 10, 12. For example, as is shown on FIG. 4, the orthogonally polarized antennas 10, 12 at base station 8 can be oriented at slant +45° and slant −45° although other orientations for the orthogonally polarized antennas 10, 12, for example, 0° and 90°, may be used. The MIMO signals 13, 14 are orthogonally polarized. Orthogonality is maintained at the dual repeater 14 by using two orthogonally polarized donor antennas 16, 18 with the same orientation, slant +45° and slant −45°. The dual repeater 15 essentially recreates the base station outputs as the repeater outputs.

There is, however, one problem to overcome with this embodiment. It is likely that multipath will reduce the orthogonality of the signals during path A (base station antennas 10, 12 to the donor antennas 16, 18), and the cascading of path A and path B (the server antennas 20, 21 in the repeater 14 to the user equipment ("UE") 25) reduces the overall performance of the MIMO signal. For example if the condition number of path A is 15 dB, and the condition number of path B is also 15 dB, then a very high signal noise ratio ("SNR") is required to overcome the errors resulting from channel estimation at the UE.

This problem is solved, in one embodiment, by placing a mechanism to restore the orthogonal polarization of the first signal 13 and the second signal 14 in the dual repeater 15 itself. The mechanism uses reference signals, for example, to determine the matrix required to restore orthogonality. This is performed by measuring the complex amplitude of each MIMO port reference signal, relative to the other MIMO port reference signal; computing the transmission matrix from these measurements; inverting the matrix; and multiplying the two signals/in to the two signals/out by the inverted transmission matrix. The system, therefore, retains orthogonality and will result in performance limited only by path B.

These calculations may be readily performed within a digital repeater, i.e. one that uses digital signal processing ("DSP") to reject undesired signals. For example, an LTE digital repeater may use a field programmable gate array ("FPGA") to perform filtering calculations to reject one or more LTE or other wireless carrier's signals while passing desired LTE MIMO signals. One or more FPGAs may be used to band pass filter the multiple MIMO signals, each down-converted, digitized and applied to the FPGA hardware, or alternatively or in combination, performed using programmed steps in a processor. Within the FPGA, or processor, MIMO reference signals may be measured using a Fast Fourier Transform that demodulates orthogonal frequency-division multiple access ("OFDMA") signals. The timing and frequency of reference signals in LTE determine their associated MIMO port. For example, MIMO port 0 and MIMO port 1 are offset in time and frequency, essentially interleaved to allow their separate identification. The measurement of the reference signals is used to establish the transmission matrix of path A by measuring the relative phase and amplitude of each MIMO port reference signal. With knowledge of the transmission matrix, inversion and multiplication may be used to correct the orthogonality of the signals within the repeater and provide an overall repeated path capable of high MIMO capacity. An advantage of this mechanism is that a MIMO repeater using the mechanism to restore orthogonality may update the transmission matrix as the propagation of path A changes. A further benefit is provided in difficult propagation environments, when path A has a high level of multipath. The MIMO repeater's received signals may have a better SNR than those of the UE, and may provide a more accurate transmission matrix measurement than the UE can provide. The MIMO repeater is generally able to improve the orthogonality of path A better than the UE can because the transmission matrix measurement is only impacted by the condition number of path A. The measurement at the UE, on the other hand, is impacted by the condition numbers of path A and path B.

Another embodiment of the present invention uses a means to decrease the condition number of path A by using the measurement of signal quality variables and UE throughput. These other measurements may be used in combination with, or alternative to, mechanisms within the repeater to decrease the condition number signals 13, 14 in path A. The condition number of path A is strongly affected by the polarization, pointing and physical separation of the dual donor antennas 16, 18 of the MIMO repeater 15. The condition number of signals 13, 14 in path A adds to the condition number of path B, the signals between the server antennas 20, 21 and UE 25, in dB, to provide the overall condition number of path A and path B. In order to minimize the overall condition number, it is important that the condition number of path A be reduced to the lowest level possible. Optimizing the pointing of the donor antennas 16, 18 may be performed using the measurement of UE throughput, or through the measurement of received signal parameters. Examples of received signal parameters are: the error vector magnitude ("EVM") of each MIMO port signal, and the ratio of reference signal power levels of MIMO port 0 and port 1. The improvement of the condition number of path A is indicated by a high ratio in the reference signal power levels of MIMO port 0 to port 1, or port 1 to port 0, as measured by each repeated donor antenna. For example, with high MIMO orthogonality, the MIMO port 0 repeated donor antenna signal is expected to have a high level of MIMO Port 0 reference signal power, compared to MIMO Port 1 reference signal power. In addition, or separately, the EVM of one MIMO port may be expected to differ substantially from the EVM of another MIMO port if the condition number is low. Therefore, antennas may be pointed to optimize path A by examining the EVM of each of the two MIMO ports. Equipment to perform these tasks is available.

For example, the Agilent Technologies EXA N9010A instrument performs measurements of reference signal EVM and reference signal power level of each MIMO port of LTE received signals. These measurements may be performed externally, or implemented within the MIMO repeater itself to provide an adjustment mechanism to optimize the pointing of donor antennas. UE throughput may be used to optimize the signals in path A. This may be performed as follows. UE throughput is increased significantly when path A is optimized and has a low condition number. A UE is placed within the coverage area of path B in an area that has local scattering capable of producing a good condition number. The UE is held in a static location, and the environment surrounding the UE is kept static. Changes in the pointing and spacing of donor antennas that improve the condition number of the signals in path A will provide improvements in UE throughput. For example, if an LTE MIMO UE shows 15 megabits per second of throughput when the received power level is high, and the network utilization is low, it is likely that the condition number of path A is degrading the MIMO capacity of the overall path A and path B combination. After re-pointing the donor antennas, for example, the UE throughput may increase to 25 megabits per second. If the power levels received at the input of the MIMO repeater and at the input of the UE are both high, before and after re-pointing donor antennas, then it is highly likely that the 15 to 25 megabit per second improved UE throughput occurred due to a reduction in the condition number of the signals in path A. The use of a UE for the optimization of path A is relatively straightforward to perform, while the use of measured received signal parameters such as EVM and reference signal power provide higher confidence at a higher cost. Field tests show that the improvement in throughput is approximately 70%, averaged over many measurements, when a MIMO repeater is used in lieu of a SISO repeater while using embodiments of the present invention.

While the principles of the present invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system to repeat MIMO signals on a network comprising,
a base station with a first antenna to transmit a first signal and a second antenna to transmit a second signal, wherein the first antenna and the second antenna are orthogonally polarized thereby causing the first signal and the second signal to be orthogonally polarized, wherein the first signal and the second signal have a condition number, further comprising means to lower the condition number of the first signal and the second signal;
a dual repeater with a first donor antenna to receive the first signal and a second donor antenna to receive the second signal, wherein the first donor antenna and the second donor antenna are orthogonally polarized; and
a mechanism to restore the orthogonal polarization of the first signal and the second signal.

2. The system of claim wherein the network is an LTE network.

3. The system of claim 1 wherein the orthogonally polarized first donor antenna and second donor antenna have the same orientation as the orthogonally polarized first antenna and second antenna.

4. The system of claim 1 wherein the first antenna is oriented a slant +45° and the second antenna is oriented at slant −45°.

5. The system of claim 4 wherein the first donor antenna is oriented at slant +45° and the second donor antenna is oriented at slant −45°.

6. A method to repeat MIMO signals in a network comprising
- transmitting a first signal from a first antenna and a second signal from a second antenna, wherein the first antenna and the second antenna are orthogonally polarized, thereby causing the first signal and the second signal to be orthogonally polarized, wherein the first signal and the second signal have a condition number, further comprising lowering the condition number of the first signal and the second signal;
- receiving the first signal at a first donor antenna on a dual repeater and the second signal at a second donor antenna on the dual repeater wherein the first donor antenna and the second donor antenna are orthogonally polarized; and
- restoring the orthogonal polarization of the first signal and the second signal.

7. The method of claim 6 wherein the network is an LTE network.

\* \* \* \* \*